United States Patent Office 3,592,689
Patented July 13, 1971

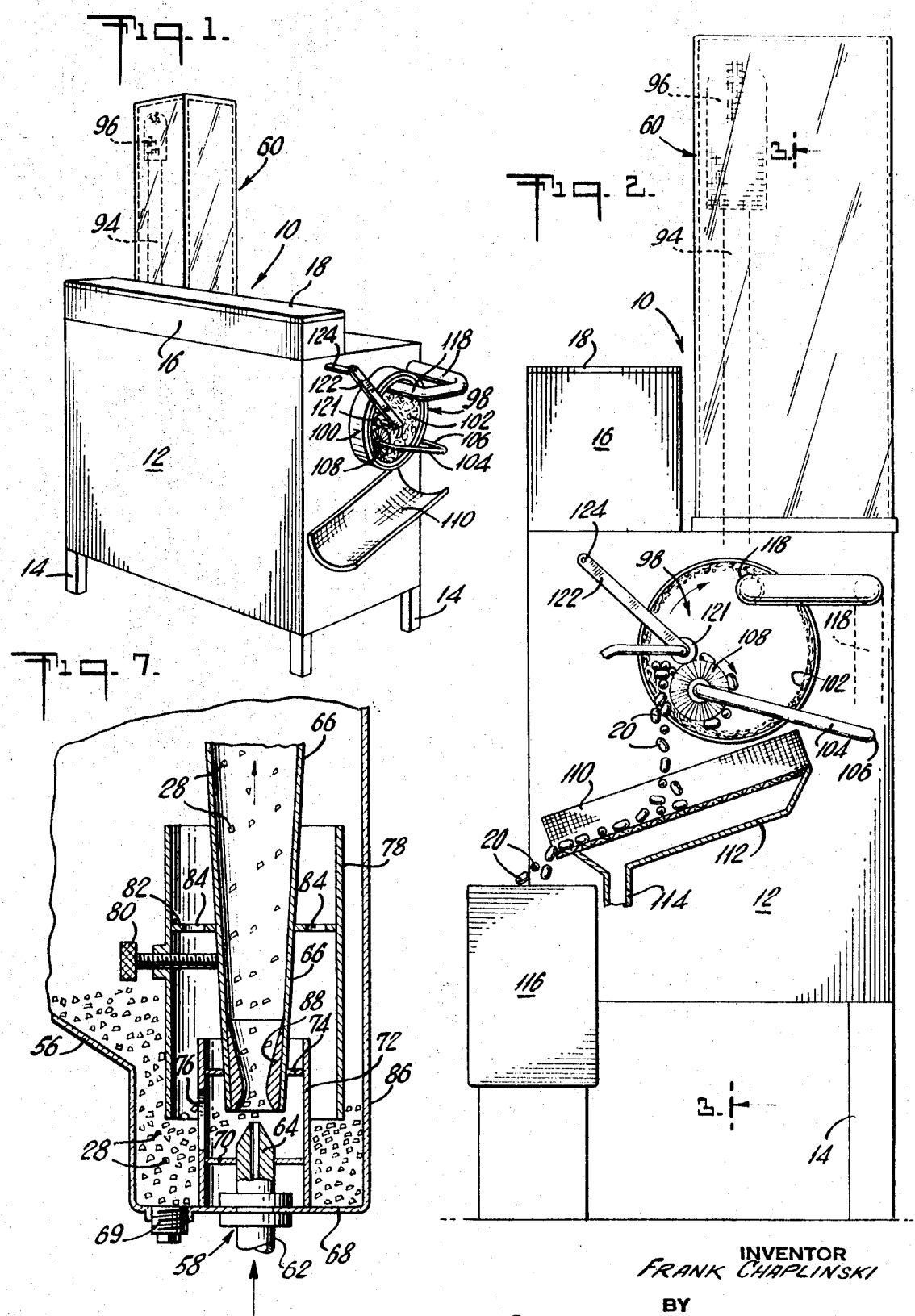

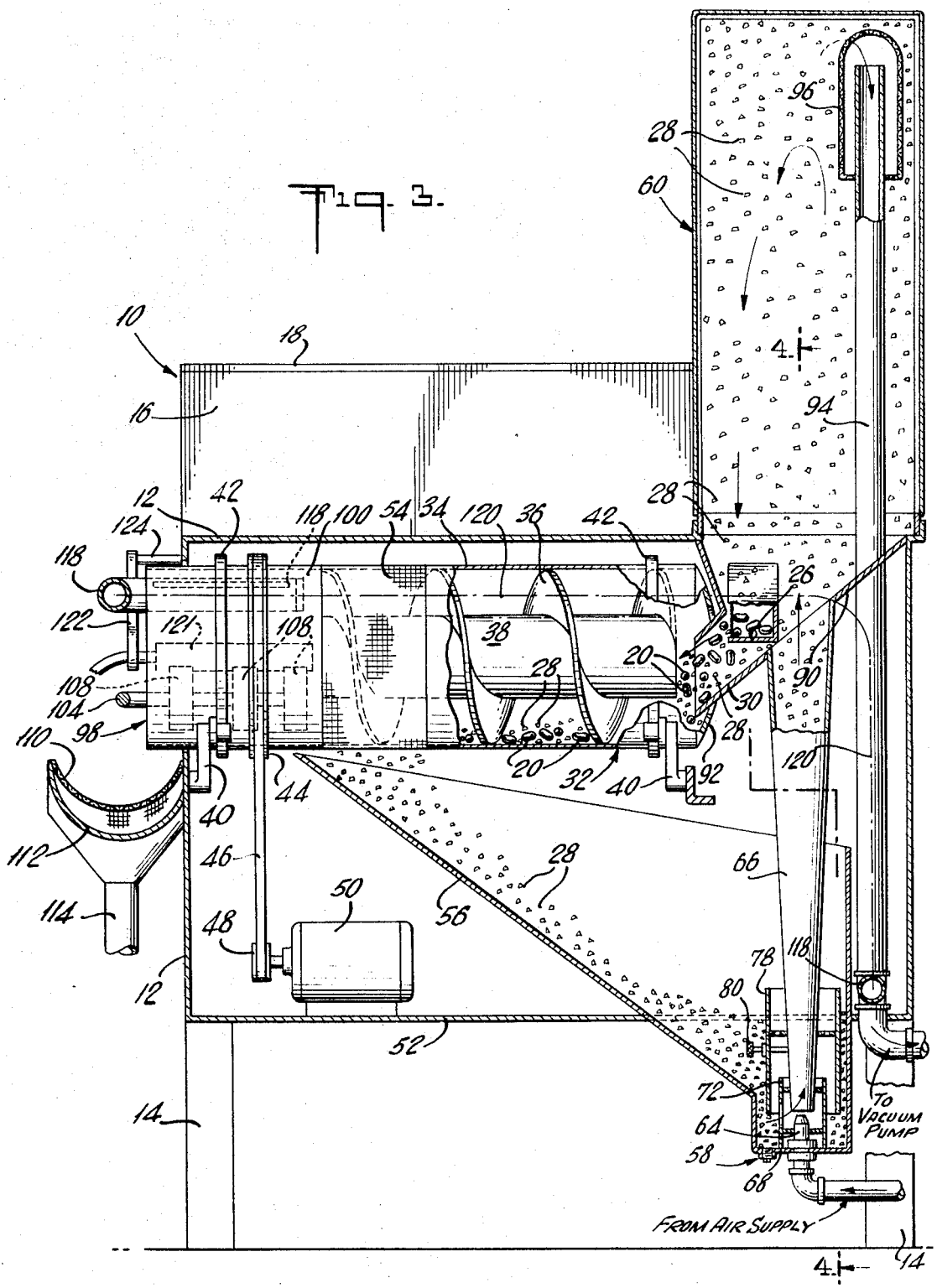

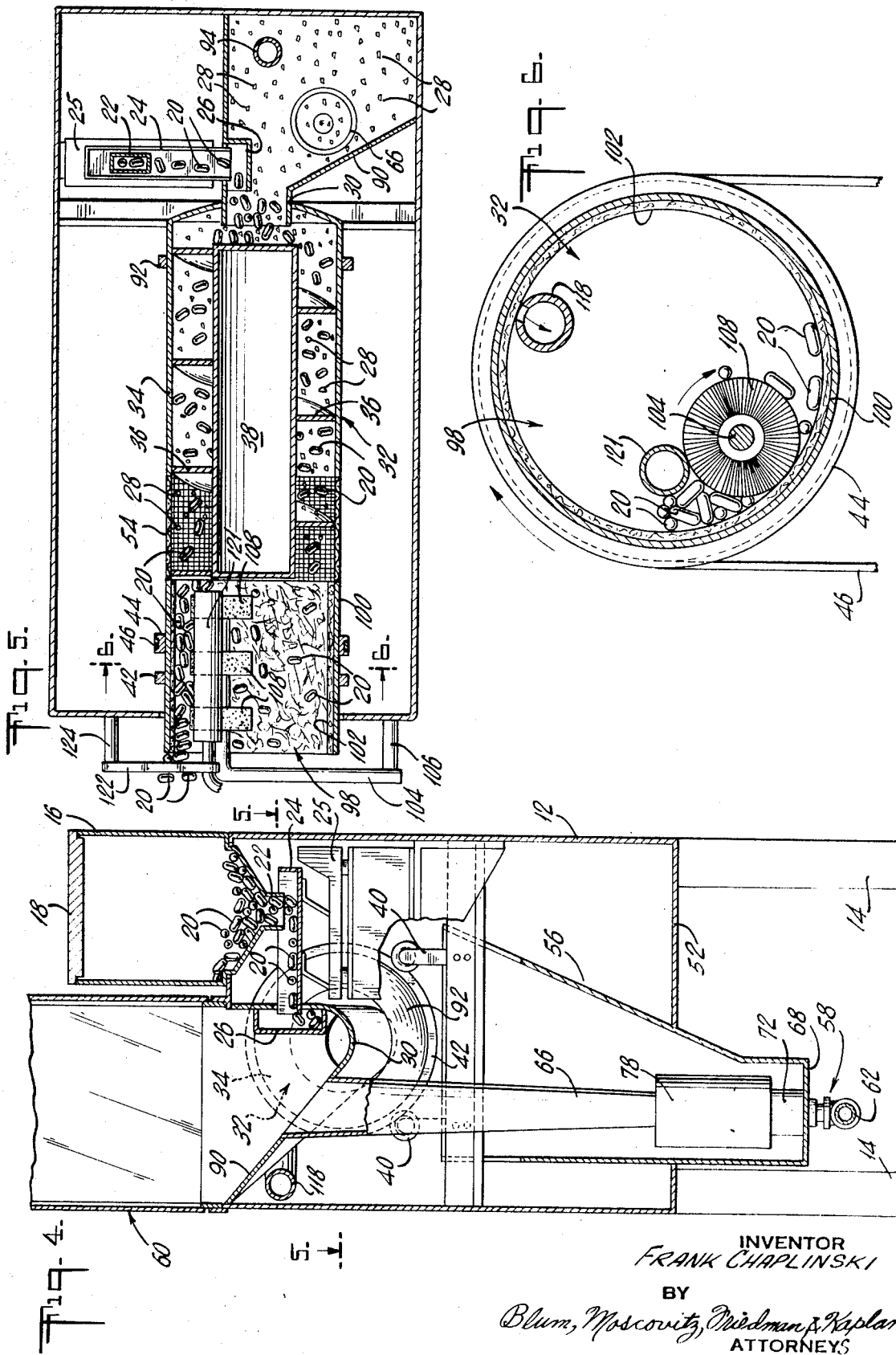

3,592,689
METHOD AND APPARATUS FOR CLEANING DUST FROM THE EXTERIOR OF CAPSULES
Frank Chaplinski, Somerset, N.J., assignor to
The Nestle-Lemur Company
Filed Jan. 28, 1970, Ser. No. 6,618
Int. Cl. B08b 7/00
U.S. Cl. 134—1    11 Claims

ABSTRACT OF THE DISCLOSURE

A method and apparatus for cleaning dust away from the exterior of capsules. The capsules which are to be cleaned are intermingled with electrostatically charged pellets which attract the dust away from the capsules onto the pellets. The capsules and pellets are fed together to a given location where the pellets with the dust thereon are separated from the capsules so that the latter can be collected in cleaned condition. The pellets with the dust thereon are then blown up into a supply tower from which the dust is eliminated by a vacuum so that in this way the pellets are cleaned. As the pellets fall down through the tower they become again electrostatically charged, and upon reaching the bottom of the tower, the pellets meet with the dust-covered capsules to again be fed with the latter so that in this way the pellets are continuously recycled.

BACKGROUND OF THE INVENTION

The present invention relates to a method and apparatus for cleaning dust away from the exterior surface of capsules.

As is well known, when conventional gelatin capsules are filled with medication in the form of a powder, for example, particles of the powder unavoidably cling to the exterior surfaces of the capsules. It is of course necessary to clean away this dust from the exterior of the capsules.

At the present time such cleaning operations are carried out by hand, so that a considerable labor cost is involved as well as an undesirable inconvenience and length of time in the treatment of the capsules.

SUMMARY OF THE INVENTION

It is accordingly a prime object of the present invention to provide a method and apparatus which will clean capsules of the above type in a fully automatic manner so that manual operations can be eliminated.

Another object of the invention is to provide a method and apparatus which are capable of continuously operating to maintain capsules which are to be cleaned in continuous movement so that without any interruptions in the operations it is possible to achieve a continuous supply of cleaned capsules from a supply of dust-covered capsules which are continuously fed to the apparatus of the invention and treated according to the method of the invention.

A still further object of the invention is to provide for the cleaning of the capsules components which can be continuously recycled so that after these components are cleaned from the dust which they collect from the capsules, they can be used over and over.

It is also an object of the invention to provide a method and apparatus which make it possible to clean and polish the capsules even after the dust has been removed therefrom through a brushing and rubbing action at the exterior surfaces of the capsules.

Also it is an object of the invention to provide for a construction of the above type a static eliminator so that the cleaned capsules will be free of any satic when received in their finally cleaned condition.

Yet another object of the invention is to provide a continuously operating structure which is composed of relatively simple rugged elements which will operate reliably to achieve the desired results.

According to the invention the capsules which are to be cleaned are fed along a predetermined path while simultaneously intermingled with and tumbled with pellets which are charged so as to attract the dust away from the capsules on to the pellets. The pellets with the dust thus collected thereon are separated from the cleaned capsules and recycled while they're being cleaned from the dust collected thereon so that cleaned pellets can be continuously fed back to the capsules. The feed means of the structure of the invention receives the pellets and the capsules at a given location and feeds them to a separating screen the mesh of which is large enough to permit the pellets to fall through but too small to permit the capsules to fall through, so that in this way the pellets and capsules are separated from each other. The pellets with the dust thereon are blown up into a supply tower, and this action separates the dust from the pellets. A vacuum means communicates with the interior of the tower to suck the dust out of the latter, and the falling pellets become recharged within the tower so that they reach the location of further capsules to be cleaned with the pellets in a charge condition capable of repeating the above operations.

BRIEF DESCRIPTION OF DRAWINGS

The invention is illustrated by way of example in the accompanying drawings which form part of this application and in which:

FIG. 1 is a simplified perspective illustration of a machine of the invention for carrying out the method of the invention;

FIG. 2 is a party schematic front elevation on an enlarged scale as compared to FIG. 1 showing the machine as it appears when looking toward the front end of the machine, part of the structure of FIG. 2 being shown in section;

FIG. 3 is a longitudinal sectional elevation taken along line 3—3 of FIG. 2 in the direction of the arrows and showing details of the machine and method of the invention;

FIG. 4 is a fragmentary transverse sectional elevation taken along line 4—4 of FIG. 3 in the direction of the arrows and showing further details of the structure of the invention;

FIG. 5 is a sectional plan view of the structure of FIG. 4 taken along line 5—5 of FIG. 4 in the direction of the arrows;

FIG. 6 is a transverse sectional elevation taken along line 6—6 of FIG. 5 in the direction of the arrows and showing the structure at a scale larger than in FIG. 5; and FIG. 7 is an enlarged fragmentary sectional elevation of the structure shown at the lower right of FIG. 3 so as to illustrate this structure in greater detail and with greater clarity.

DESCRIPTION OF PREFERRED EMBODIMENTS

Referring now to the drawings, the machine 10 of the invention is mounted, in part, in a suitable enclosure 12 supported on the legs 14, as indicated in FIG. 1. The enclosure 12 carries at its upper left, as viewed in FIGS. 1 and 2, an elongated container 16 closed by a removable lid 18, as shown most clearly in FIG. 4. In effect, the container 16 forms a hopper of a supply means which in part supplies capsules 20 to the apparatus to be cleaned therein. Thus, as is shown in FIG. 4, the enclosure 12 has an upper wall formed with an opening which receives the lower tapered portion of the container 16. This tapered portion of the container 16 terminates in an outlet 22 through which the capsules 20 fall by gravity onto a chute 24 vibrated by vibrator 25. From the chute 24 the capsules fall into a guide 26 from which the capsules flow to be intermingled with pellets 28 which flow with the capsules 20 through an inlet 30 to the receiving end of a feeding means 32.

The feed means 32 feeds the capsules 20 and pellets 28 along a given path while tumbling and intermingling the capsules and pellets. The pellets 28 are in the form of relatively small spheres which are electrically charged so as to attract dust away from the exterior of the capsules. Up to the present time, electrostatically charged polystyrene pellets have proved to be most suitable for this purpose.

The feed means includes an outer cylindrical casing 34 which carries in its interior a worm 36. The worm 36 surrounds an elongated shaft 38 of relatively large diameter, so that it is not possible for the capsules and pellets to reach the region of the central axis of the worm 36. The worm 36 is simply fixed within the cylindrical casing 34 and rotates therewith as a unit, and during rotary movement of the casing 34 and worm 36 about their common axis, the pellets and capsules simply tumble and fall along the helical path defined by the components 34 and 36, so as to progress from the right toward the left, as viewed in FIG. 3. Suitable stationary brackets 40 carried by the enclosure 12 support circular bearing rings 42, and these rings surround and support the cylindrical casing 34 for rotary movement about its axis. In addition the casing 34 fixedly carries a pulley 44 around which a drive belt 46 extends. This belt is driven by an output pulley 48 of a motor 50 carried by the bottom wall 52 of the enclosure 12 as shown most clearly in FIG. 3.

At the region of approximately the last convolution of the worm 36, the casing 34 takes the form of a cylindrical screen 54. This cylindrical screen 54 simply forms an extension of the cylindrical wall of the remainder of the casing 34. This screen 54 forms a separating means which will separate the pellets 28 from the capsules 20. For this purpose the mesh of the screen 54 is such that while the smaller pellets 28 can fall through the screen, the capsules 20 cannot fall through the screen and therefore continue to be fed toward the left, as viewed in FIGS. 3 and 5, by the feed means 32, while the separated pellets drop down a chute 56, the upper left end of which is situated beneath the separating means 54 to receive the pellets therefrom.

This chute 56 extends down through the lower wall 52 of the enclosure 12 so as to direct the pellets 28 with the accumulated dust thereon to a blower means 58 which serves to blow the pellets up into the tower 60 which extends upwardly beyond the hopper 16 and enclosure 12 and which may, for example, be made of a transparent plastic wall structure. The tower 60 forms an enclosure which does not communicate with the outer atmosphere. The blower means 58 includes an inlet pipe 62 which receives compressed air from any suitable source and which discharges the compressed air through a nozzle 64 into the lower end of the downwardly tapering pipe 66.

As is shown most clearly in FIG. 7, the chute 56 delivers the pellets 28 to a lower wall 68 closed by a plug 69 and through which the compressed air pipe 62 extends to be connected to the nozzle 64. The nozzle 64 extends through a transverse wall 70 which is fixed to the interior of and extends across a tubular sleeve 72 which has an upper transverse wall 74 through which the pipe 66 extends, so that these walls 70 and 74 define with the sleeve 72 an enclosure which is closed at the top and bottom and which communicates in its interior on the one hand with the nozzle 64 and on the other hand with the pipe 66. The sleeve 72 is formed at its left region, as viewed in FIG. 7, with an inlet opening 76. The sleeve 72 is in turn surrounded by a relatively short cylindrical pipe 78 adjustably fixed on the pipe 66 by a screw 80 and itself carrying a transverse wall 82 formed with a plurality of openings 84 passing therethrough. The chute 56 is closed at its bottom end by the bottom wall 68, which carries the removable plug 70, and at its right end by a vertical end wall 86. The elevation of the pipe 78 is such that its bottom edge extends downwardly part of the way across the inlet opening 76 of the sleeve 72. The pipe 66 fixedly carries in its interior at its bottom end region a Venturi 88. Thus, as a jet of air issues upwardly from the nozzle 64 into the Venturi 88 the air will rapidly flow upwardly through the throat of the Venturi 88 at a high speed but at a low pressure, as is well known with Venturi's. Air can flow freely down through the interior of the pipe 78 and through the openings 84 of the plate 82 so as to reach the inlet 76 and be drawn therethrough into the Venturi. This air will carry along with it the pellets 28 which collect at the bottom wall 68 surrounding the sleeve 72 and are capable of entering into the pipe 66 only through the inlet 76 and the Venturi 88.

As is shown most clearly in FIGS. 3 and 4, the upper end of the tapered pipe 66 communicates through the bottom inclined wall 90 of the tower 60 with the interior of the latter. Thus, this inclined wall 90, which inclines in the two directions apparent from FIGS. 3 and 4, is formed with an opening which matches the configuration of the top end of the pipe 66 which is fixed in a fluid-tight manner to the wall 90 so that all of the air which flows up through the pipe 66 will forcefully enter into the tower 60 propelling the pellets 28 into the latter. Thus, the pellets are supported by and propelled by the stream of air constantly flowing upwardly into the tower 60. The force of the stream of air is sufficiently great to cast the pellets all the way up toward the upper region of the tower 60 from where the pellets fall back down to the inclined wall 90 which terminates in the inlet 30 to the rotary feed means 32. For this purpose, the inlet end of the casing 34 is simply formed with a curved end wall 92 forming a part of the sphere and formed with a central opening through which the tubular outlet 30 extends from the bottom region of the tower 60. The polystyrene pellets recharge themselves as they fall down through the tower back to the starting end of the path along which the intermingled pellets and capsules are fed by the feed means 32.

The propelling of the pellets 28 suspended in the air stream forcefully up into the tower 60 separates the dust from the exterior surface of the pellets, and this dust floats in the interior space of the tower 60. An elongated pipe 94 extends fluid-tightly up through the bottom wall 90 of the tower to the upper end region of the interior thereof. This pipe 94 communicates with any suitable source of suction. For example, the pipe 94 may be connected to a vacuum pump, and it may be provided with any adjusting valve for the purpose of controlling the flow of air from the tower 60 into the suction pipe 94. At its top end the pipe 94 is covered by a screen enclosure 96, the mesh of which is fine enough to permit the dust to freely flow through the screen 96 into the open top end of the suction pipe 94 while preventing any pellets from being received in the pipe 94. The suction of the pipe 94 is not of a force which is great enough to draw any pellets to the screen 96, but it is great enough to suck dust out of the air within the tower 60 and into the pipe 94. In this way the dust is removed and collected at any desired location. The pellets simply fall by gravity back to the feed means 32 so as to be recycled, after cleaning, together with additional capsules which continuously flow into the machine from the hopper 16. Thus, this hopper 16, on the one hand, and the tower 60, on the other hand, form a supply means for supplying the capsules and pellets to the feed means 32 which feeds the capsules and pellets while intermingling and tumbling them to the separating means 54, where the pellets 28 are separated from the cleaned capsules.

The thus-cleaned capsules are further cleaned and polished by an additional cleaning means 98 situated at the front of the machine. This additional cleaning means 98 includes a cylindrical casing portion 100 which forms an integral part of the casing 34. Thus, the casing portion 100 forms the front end of the casing 34 and is of the same diameter as the latter. The screen 54 is interposed between the casing portion 100 and the remainder of the casing 34. In fact it is the casing portion 100 which extends through one of the bearings 42 and which carries the driving pulley 44. The front end of the casing 34 is open and extends forwardly beyond the front wall of the enclosure 12, as is particularly apparent from FIG. 3.

The interior of the front casing portion 100 is lined with a pile fabric 102 which may be a part of a rug or carpet of a fairly thick pile. A curved shaft 104 is pivotally mounted on a pivot 106 (FIG. 5), which extends forwardly from the front wall of the enclosure 12. This curved shaft 104 has distant from the pivot 106 an elongated portion which rotatably carries a plurality of brushes 108. Because of the swingability of the L-shaped shaft 104 on the pivot 106, the brushes 108 simply rest by gravity on the inner surface of the pile-fabric liner 102. Thus, as the feed means 32 continues to rotate, the separated capsules will be delivered into the casing portion 100 as they move beyond the separating means 54, and the brushes 108 are turned by frictional engagement with the liner 102 on which they rest. As a result, the several capsules are forced to pass between the brushes 108 and the liner, as is apparent from FIG. 6, so that in this way the cleaned capsules will be polished and further cleaned before dropping from the open end of the feed means onto an inspection chute 110. This inspection chute is in the form of a screen through which pellets can fall so that if any pellets are still situated with the capsules, they can simply fall through the screen 110 to be received on a chute 112 therebeneath and to then flow through a pipe 114 to any suitable collection location. The thus-treated capsules are simply collected in any suitable way, as in a box 116 shown schematically in FIG. 2.

A second vacuum pipe 118 extends along the interior of the casing portion 100 and has openings communicating with the pile liner 102. This vacuum pipe 118 also communicates with a source of suction, which may be the same source as is used for the pipe 94, and this connection is schematically indicated by the dot-dash line 120 in FIG. 3. Thus, the pile fabric liner 102 is continuously cleaned as it rotates. Of course, the free end of the vacuum pipe 118, which is its right end, as viewed in FIG. 3, is closed, so that the suction will act through the openings along the upper region of the pipe 118, as indicated in FIG. 6.

The machine is completed by a conventional static eliminator 121. This static eliminator 121 rests on the brushes 108 and extends through the open front end of the rotary casing 34, where the static eliminator is carried by a freely swingable lever 122 also mounted on a pivot pin 124 fixed to and extending forwardly from the front wall of the enclosure 12. Lever 122 is adapted to be raised by the operator so as to raise the static eliminator away from the brushes 108.

It is thus clear that with the method and machine of the invention the capsules can be maintained in continuous movement while they are cleaned and polished, and the pellets can be continuously recycled so as to always be in an electrostatically charged clean condition when reaching the inlet end of the feed means.

What is claimed is:

1. In a method of cleaning dust from the exterior of capsules, comprising the steps of continuously feeding capsules which are to be cleaned along a given path, intermingling with the capsules while they are fed along said path pellets which have an electrostatic charge which attracts the dust away from the capsules to the pellets, so as to clean the capsules, and then separating the capsules and pellets so that the cleaned capsules can be collected while the dust cleaned therefrom is retained by the pellets.

2. In a method as recited in claim 1 and wherein the pellets with the dust thereon are cleaned, recharged, and fed back to the capsules moving along said path, so that a continuous flow of capsules and pellets can be maintained.

3. In an apparatus for cleaning dust from the exterior surface of capsules, comprising electrostatically charged pellets, supply means for supplying both capsules which are to be cleaned and said pellets which are so charged as to attract the dust away from the capsules to a given location, feed means receiving the capsules and pellets at the latter location and feeding them away from the latter location while tumbling the capsules and pellets to intermingle them with each other while they are fed by the feed means, and separating means to which the capsules and pellets are fed by said feed means, said separating means separating the pellets with the dust thereon from the capsules so that the latter can be received in cleaned condition.

4. The combination of claim 3 and wherein the pellets are smaller than the capsules, said separating means being a screen through which the pellets fall, but having a mesh too small to permit the capsules to fall therethrough.

5. The combination of claim 3 and wherein said supply means includes a tower down which the pellets fall to be recharged in the tower while traveling toward said location where they meet with the capsules, blowing means for blowing the pellets with the dust thereon upwardly into the tower to clean the pellets while freeing them for falling movement downwardly through the tower, and vacuum means communicating with the interior of the tower for sucking dust separated from the pellets out of the tower, so that clean pellets can be recycled back to said feed means to be tumbled again and intermingled with the capsules.

6. The combination of claim 5 and wherein said feed means includes a rotary screw and a cylindrical casing in which the screw is accommodated so that the pellets and capsules are fed and tumbled longitudinally along said casing, said separating means including a screen to which the capsules and pellets are fed, with said screen having a mesh too small to permit the capsules to fall therethrough but large enough for the pellets to fall therethrough, receiving means receiving the pellets which fall through said screen and directing the pellets to the blowing means, said blowing means including a Venturi through which a stream of air is upwardly blown and through which the pellets are propelled upwardly into said tower.

7. The combination of claim 3 and wherein an additional cleaning means is situated beyond said separating means to receive the capsules and additionally clean them.

8. The combination of claim 7 and wherein said additional cleaning means includes a layer of pile fabric and a rotary brush coacting therewith for moving the capsules between the brush and pile fabric to further clean the capsules.

9. The combination of claim 8 and wherein a vacuum means coacts with the pile fabric for cleaning the latter.

10. The combination of claim 7 and wherein a static-eliminating means is located at the additional cleaning means for eliminating static from the capsules.

11. The combination of claim 7 and wherein a chute is situated to receive the capsules from said additional cleaning means and to continue the feeding of the capsules while spreading them for inspection.

References Cited

UNITED STATES PATENTS

| | | | |
|---|---|---|---|
| 458,571 | 9/1891 | Gedge. | |
| 774,826 | 11/1904 | Butler | 134—7X |
| 886,075 | 4/1908 | Remington. | |
| 1,925,362 | 9/1933 | Anstiss. | |
| 2,425,984 | 8/1947 | Blackman | 134—7 |
| 2,918,691 | 12/1959 | Lake | 15—3.21X |

JOSEPH SCOVRONEK, Primary Examiner

J. T. ZATARGA, Assistant Examiner

U.S. Cl. X.R.

15—1.5, 3.16, 3.21; 134—7, 25